US 9,112,866 B2

(12) United States Patent
Carrara et al.

(10) Patent No.: US 9,112,866 B2
(45) Date of Patent: Aug. 18, 2015

(54) METHODS AND DEVICES FOR CONTROLLING ACCESS TO COMPUTING RESOURCES

(71) Applicant: BlackBerry Limited, Waterloo (CA)

(72) Inventors: Michael Anthony Carrara, Ottawa (CA); Daniel Jonas Major, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/132,728

(22) Filed: Dec. 18, 2013

(65) Prior Publication Data
US 2014/0109085 A1     Apr. 17, 2014

Related U.S. Application Data

(63) Continuation of application No. 13/155,217, filed on Jun. 7, 2011, now Pat. No. 8,650,550.

(51) Int. Cl.
*G06F 9/44* (2006.01)
*H04L 29/06* (2006.01)
*G06F 21/54* (2013.01)
*G06F 9/445* (2006.01)
*H04L 29/08* (2006.01)
*G06F 11/34* (2006.01)

(52) U.S. Cl.
CPC ... *H04L 63/10* (2013.01); *G06F 8/61* (2013.01); *G06F 21/54* (2013.01); *G06F 8/60* (2013.01);
(Continued)

(58) Field of Classification Search
CPC ............ G06F 8/60; G06F 8/61; G06F 8/65; G06F 8/67; G06F 8/68; G06F 11/3466; G06F 11/3636; G06F 2201/865; H04L 29/08981
See application file for complete search history.

(56) References Cited

U.S. PATENT DOCUMENTS 7,096,491 B2   8/2006   Cheng
7,174,534 B2   2/2007   Chong et al.
(Continued)

FOREIGN PATENT DOCUMENTS

EP   1465039 A1   10/2004
EP   1564957 B1    8/2005
(Continued)

OTHER PUBLICATIONS
Kapil Singh, "Practical Context-Aware Permission Control for Hybrid Mobile Applications", Springer-Verlag Berlin Heidelberg, RAID 2013, LNCS 8145, pp. 307-327; <http://link.springer.com/chapter/10.1007%2F978-3-642-41284-4_16#p.-1>.*
(Continued)

*Primary Examiner* — Thuy Dao
*Assistant Examiner* — Ben C Wang
(74) *Attorney, Agent, or Firm* — Integral Intellectual Property Inc.; Miriam Paton; Amy Scouten

(57) ABSTRACT

Methods and devices for controlling access to resources are disclosed herein. In one example embodiment, the method comprises: executing an application at a first computing device, wherein an attempt to access a computing resource on the computing device is made by the application; determining that the application is not configured to access the computing resource, in response to the attempt; displaying, in a user interface of the computing device, a permission request to allow the application to access the computing resource; and transmitting data from the computing device to the application server, the data notifying the application server that the attempt to access the computing resource was made by the application when the application was not configured to access the computing resource, and the data being usable by the application server to determine whether a corresponding computing resource on at least one different computing device is likely to be accessed when the application is executed on the at least one different computing device.

20 Claims, 8 Drawing Sheets

(52) U.S. Cl.
CPC ... *G06F 8/65* (2013.01); *G06F 8/67* (2013.01); *G06F 8/68* (2013.01); *G06F 11/3466* (2013.01); *H04L 29/08981* (2013.01)

(56) References Cited

U.S. PATENT DOCUMENTS

| | | | |
|---|---|---|---|
| 7,614,078 B1* | 11/2009 | Stieglitz | 726/2 |
| 7,647,036 B2 | 1/2010 | Omae et al. | |
| 8,255,991 B1* | 8/2012 | Hackborn et al. | 717/178 |
| 8,265,595 B1* | 9/2012 | Reeves et al. | 455/410 |
| 8,272,030 B1 | 9/2012 | Annan et al. | |
| 8,281,410 B1 | 10/2012 | Sobel et al. | |
| 8,406,734 B2* | 3/2013 | Otaka et al. | 455/410 |
| 8,650,550 B2 | 2/2014 | Carrara et al. | |
| 8,763,080 B2* | 6/2014 | Carrara et al. | 726/2 |
| 8,844,026 B2* | 9/2014 | Truskovsky et al. | 726/19 |
| 8,849,957 B1* | 9/2014 | Boodman et al. | 709/219 |
| 8,990,795 B2* | 3/2015 | Brunsman et al. | 717/173 |
| 2003/0051169 A1 | 3/2003 | Sprigg et al. | |
| 2004/0088563 A1 | 5/2004 | Hogan et al. | |
| 2004/0148514 A1 | 7/2004 | Fee et al. | |
| 2004/0204073 A1 | 10/2004 | Yanosy | |
| 2005/0075101 A1* | 4/2005 | Tsuda et al. | 455/418 |
| 2005/0124332 A1 | 6/2005 | Clark et al. | |
| 2005/0210035 A1 | 9/2005 | Kester et al. | |
| 2005/0213763 A1 | 9/2005 | Owen et al. | |
| 2005/0289348 A1 | 12/2005 | Joy et al. | |
| 2006/0026667 A1 | 2/2006 | Bhide et al. | |
| 2006/0090192 A1 | 4/2006 | Corby et al. | |
| 2007/0150617 A1 | 6/2007 | Hariki | |
| 2007/0192839 A1 | 8/2007 | Fee et al. | |
| 2008/0014912 A1 | 1/2008 | Otaka et al. | |
| 2008/0052383 A1 | 2/2008 | O'Shaughnessy et al. | |
| 2009/0172657 A1* | 7/2009 | Makelainen et al. | 717/174 |
| 2009/0199296 A1 | 8/2009 | Xie et al. | |
| 2009/0271844 A1* | 10/2009 | Zhang et al. | 726/2 |
| 2010/0087184 A1 | 4/2010 | Stoev et al. | |
| 2010/0197326 A1* | 8/2010 | Ngo | 455/466 |
| 2010/0242097 A1* | 9/2010 | Hotes et al. | 726/4 |
| 2010/0262619 A1 | 10/2010 | Zargahi et al. | |
| 2011/0055926 A1 | 3/2011 | Bennett et al. | |
| 2011/0307831 A1 | 12/2011 | Cowan et al. | |
| 2012/0204235 A1 | 8/2012 | Jaudon et al. | |
| 2012/0209923 A1 | 8/2012 | Mathur et al. | |
| 2012/0291102 A1* | 11/2012 | Cohen | 726/4 |
| 2012/0303476 A1* | 11/2012 | Krzyzanowski et al. | 705/26.5 |
| 2012/0317565 A1* | 12/2012 | Carrara et al. | 717/178 |
| 2012/0317609 A1* | 12/2012 | Carrara et al. | 726/1 |
| 2012/0317638 A1* | 12/2012 | Carrara et al. | 726/17 |
| 2013/0051615 A1* | 2/2013 | Lim et al. | 382/103 |
| 2013/0152070 A1* | 6/2013 | Bhullar et al. | 717/178 |
| 2013/0219383 A1* | 8/2013 | Hilerio et al. | 717/178 |
| 2013/0326614 A1* | 12/2013 | Truskovsky et al. | 726/19 |
| 2013/0339942 A1* | 12/2013 | Brunsman et al. | 717/173 |
| 2014/0082661 A1* | 3/2014 | Krahnstoever et al. | 725/32 |
| 2014/0245448 A1* | 8/2014 | Moon et al. | 726/25 |
| 2014/0282371 A1* | 9/2014 | Hirsch et al. | 717/106 |
| 2014/0298320 A1* | 10/2014 | Xu et al. | 717/174 |

FOREIGN PATENT DOCUMENTS

| | | |
|---|---|---|
| EP | 2533150 A1 | 12/2012 |
| EP | 2533168 A1 | 12/2012 |
| EP | 2533170 A1 | 12/2012 |
| GB | 2353918 A | 3/2001 |

OTHER PUBLICATIONS

Claycomb et al., "Towards Secure Resource Sharing for Impromptu Collaboration in Pervasive Computing", 2007 ACM, SAC'07 Mar. 11, 2007, pp. 940-946; <http://dl.acm.org/results.cfm?h=1&cfid=653252866&cftoken=75094448>.*

Gupta et al., "Using context-profiling to aid access control decisions in mobile devices", 2011 IEEE, Mar. 21, 2011, pp. 310-312; <http://ieeexplore.ieee.org/stamp/stamp.jsp?tp=&arnumber=5766891>.*
Non-Final Office Action. U.S. Appl. No. 13/155,217. Dated Apr. 11, 2013.
Extended European Search Report, European Patent Application No. 11169026.9, dated Feb. 29, 2012.
Non-Final Office Action, U.S. Appl. No. 13/155,116, dated Nov. 29, 2012.
Response to Non-Final Office Action, U.S. Appl. No. 13/155,116, dated Feb. 28, 2013.
Non-Final Office Action, U.S. Appl. No. 13/155,181, dated Nov. 15, 2012.
Response to Non-Final Office Action, U.S. Appl. No. 13/155,181, dated Feb. 14, 2013.
Final Office Action. U.S. Appl. No. 13/155,116. Dated May 13, 2013.
Final Office Action. U.S. Appl. No. 13/155,181. Dated May 9, 2013.
Response to Extended European Search Report. European Patent Application No. 11169026.9. Dated Jun. 12, 2013.
Applicant Initiated Interview Summary. U.S. Appl. No. 13/155,116. Dated Jul. 25, 2013.
Response to Final Office Action. U.S. Appl. No. 13/155,116. Dated Jul. 31, 2013.
Request for Continued Examination (RCE). U.S. Appl. No. 13/155,116. Dated Jul. 31, 2013.
Response to Final Office Action. U.S. Appl. No. 13/155,181. Dated Aug. 7, 2013.
Request for Continued Examination (RCE). U.S. Appl. No. 13/155,181. Dated Aug. 7, 2013.
Office Action. Canadian Patent Application No. 2,778,736. Dated Dec. 5, 2013.
Response to Non-Final Office Action. U.S. Appl. No. 13/155,217. Dated Jul. 5, 2013.
Examiner Interview Summary. U.S. Appl. No. 13/155,217. Dated Aug. 22, 2013.
Notice of Allowance. U.S. Appl. No. 13/155,217. Dated Sep. 4, 2013.
Applicant Interview Summary. U.S. Appl. No. 13/155,217. Dated Sep. 4, 2013.
Intent to Grant. U.S. Appl. No. 13/155,217. Dated Dec. 11, 2013.
Request for Continued Examination (RCE). U.S. Appl. No. 13/155,217. Dated Dec. 12, 2013.
Petition to Withdraw an Application From Issue After Payment of Issue Fee. U.S. Appl. No. 13/155,217. Dated Dec. 12, 2013.
Decision on Petition. U.S. Appl. No. 13/155,217. Dated Dec. 12, 2013.
Prosecution Documents for U.S. Appl. No. 13/155,217, issued to U.S. Pat. No. 8,650,550 on Feb. 11, 2014.
Office Action. Canadian Patent Application No. 2,778,736. Dated: Aug. 19, 2014.
Notice of Allowance. U.S. Appl. No. 13/155,116. Dated: Feb. 12, 2014.
Amendment after Allowance. U.S. Appl. No. 13/155,116. Dated: Apr. 28, 2014.
Response to Rule 312 Communication. U.S. Appl. No. 13/155,116. Dated: May 23, 2014.
Response. European Patent Application No. 11169028.5. Dated: Mar. 14, 2013.
Exam Report. European Patent Application No. 11169028.5. Dated: Nov. 11, 2014.
Office Action. Canadian Patent Application No. 2,778,737. Dated: Jul. 31, 2014.
Office Action. U.S. Appl. No. 13/155,181. Dated: Jul. 17, 2014.
Amendment. U.S. Appl. No. 13/155,181. Dated: Oct. 17, 2014.
Notice of Allowance. U.S. Appl. No. 13/155,181. Dated: Nov. 18, 2014.
Response. European Patent Application No. 11169193.7. Dated: Jun. 12, 2013.
Office Action. Canadian Patent Application No. 2,778,572. Dated: Jun. 4, 2014.
TRAN, Notice of Allowance for U.S. Appl. No. 13/155,181, Jan. 30, 2015.

* cited by examiner

METHODS AND DEVICES FOR CONTROLLING ACCESS TO COMPUTING RESOURCES

CROSS-REFERENCE TO RELATED APPLICATION

This application is a continuation of U.S. patent application Ser. No. 13/155,217, filed Jun. 7, 2011. The entire contents of U.S. patent application Ser. No. 13/155,217 are hereby incorporated by reference.

FIELD

Embodiments described herein relate generally to controlling access to computing resources by applications executing on a computing device.

BACKGROUND

When executing an application on a computing device, the application may access functionality provided by a computing resource on the computing device. For example, a computing resource may include a camera with which photographic operations may be performed, or a Global Positioning System (GPS) subsystem which may indicate the physical location of the computing device. To prevent unauthorized access to certain computing resources on the computing device by, for example, third-party applications, the device may be configured to request permission to access the computing resources from a user before allowing an application to access the computing resource.

An application developer may disclose the computing resources that the developer's application may access when the application is executed on a computing device, by identifying those computing resources in an installation manifest. This installation manifest can then be provided to computing devices upon which the application is to be installed. The installation manifest may be read when the application is being installed at a given computing device, so that, for each of one or more of the computing resources identifying in the installation manifest, a permission request to access the computing resource can be displayed to the user before the application is executed.

BRIEF DESCRIPTION OF THE DRAWINGS

For a better understanding of the described embodiments and to show more clearly how they may be carried into effect, reference will now be made, by way of example, to the accompanying drawings in which.

DESCRIPTION OF EXAMPLE EMBODIMENTS

Figure 1:
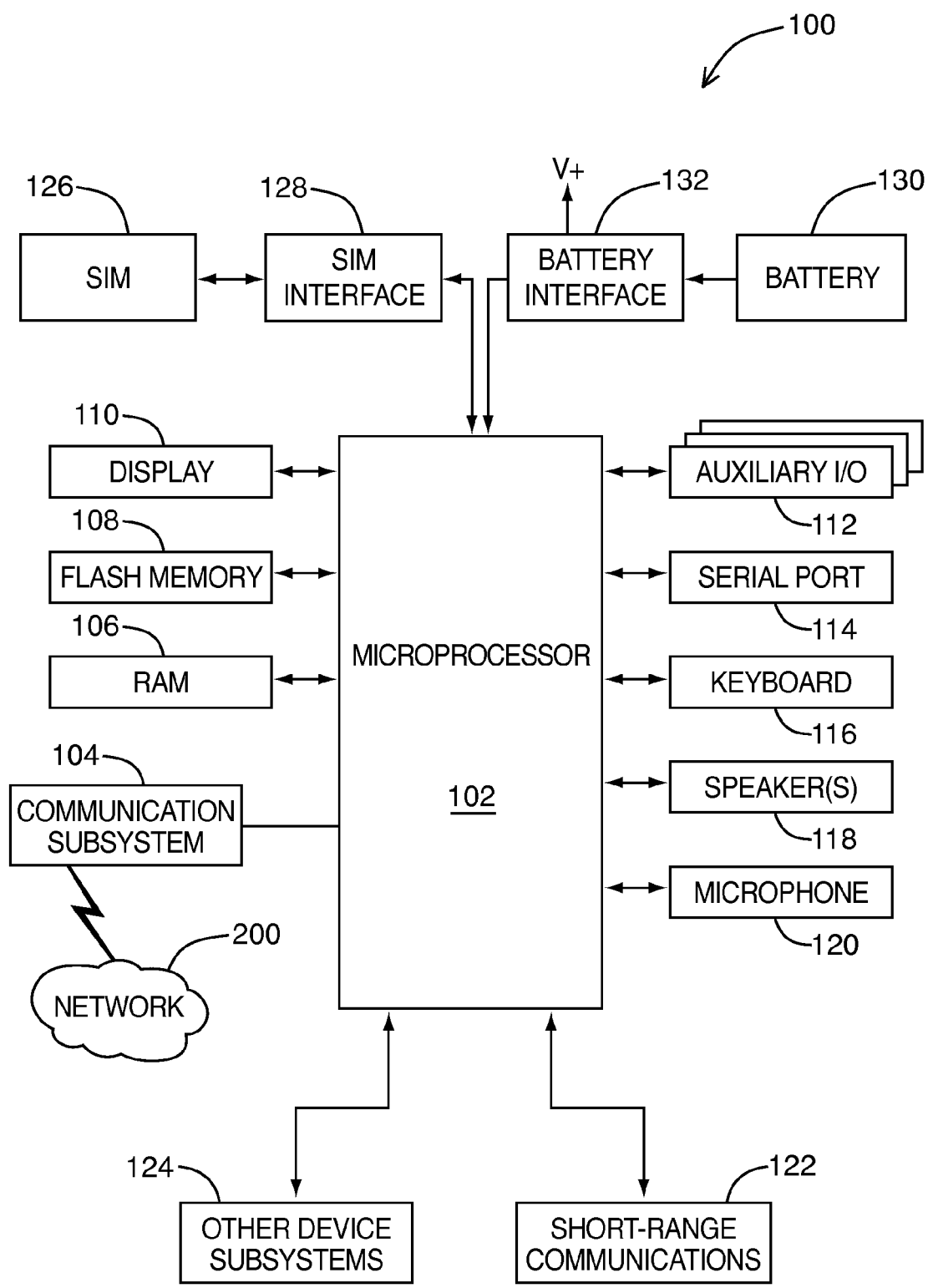
FIG. 1 is a block diagram of a mobile device in one example implementation.

The computing resources that are identified in an installation manifest associated with an application as being computing resources that the application may access when the application is executed on a given computing device are so identified at the discretion of the application developer. Accordingly, the installation manifest may not always be complete.

There may be computing resources that the application accesses during execution that have not been identified in the installation manifest associated with the application. Had those computing resources actually been identified in the installation manifest, a user would have been able to accept (or deny) permission requests to allow the application to access those computing resources during an installation of the application. However, since the computing resources were not identified in the installation manifest, a user may not become aware that the application will access those computing resources until after the installation of the application is complete, and the application is being executed (i.e. at runtime). When, during execution of the application, the application accesses a computing resource that the installation manifest fails to identify, an out-of-context and undesirable prompt may be displayed to the user. Such prompts are generally undesirable because it may be preferable to obtain user permissions regarding access to computing resources by an application when the application is installed, and not later when the computing resources are actually accessed.

In general, permission requests that are displayed during execution of the application can disrupt the user experience of the application. For example, if a device attempts to upload a stored photo from an application, the device may be provide a prompt with a request to access the file system on the computing device before being allowed to select the desired photo. This may be jarring and inconvenient for the user.

Also, permission requests to allow an application to access computing resources may indicate to a user that the application is potentially harmful. For example, if a game application attempts to access private email messages on the computing device, this may raise a security concern regarding the application. The user might have elected not to install this application in the first place, if the user were made aware of this application's behavior prior to installation. Therefore, it may be desirable to allow the user to deal with these permission requests during installation of the application, and not during execution of the application after the application has already been installed.

At least some embodiments described herein generally relate to methods that facilitate the indication to a computing device, during installation of an application, that a computing resource will likely be accessed on the computing device by the application even though the computing resource is not yet so identified in an installation manifest associated with that application. This may minimize the number of permission requests to access computing resources that will be displayed to a user during execution of the application.

In one broad aspect, there is provided a method of transmitting data from a computing device to an application server, the method comprising: executing an application at the computing device, wherein an attempt to access a computing resource on the computing device is made by the application; determining that the application is not configured to access the computing resource, in response to the attempt; displaying, in a user interface of the computing device, a permission request to allow the application to access the computing resource; and transmitting data from the computing device to the application server, the data notifying the application server that the attempt to access the computing resource was made by the application when the application was not configured to access the computing resource, and the data being usable by the application server to determine whether a corresponding computing resource on at least one different computing device is likely to be accessed when the application is executed on the at least one different computing device.

In some embodiments, the application is not configured to access the computing resource if an installation manifest associated with the application fails to identify the computing resource as a resource that the application will access on the computing device when the application is executed.

In some embodiments, the method further comprises: downloading the application to the computing device; downloading the installation manifest associated with the application to the computing device; and installing the application on the computing device. The method may further comprise: allowing the application to access the computing resource if an acceptance of the permission request is received.

In another broad aspect, there is provided a computing device configured to transmit data to an application server, wherein the computing device comprises a processor configured to: execute an application, wherein an attempt to access a computing resource on the computing device is made by the application; determine that the application is not configured to access the computing resource, in response to the attempt; display, in a user interface of the computing device, a permission request to allow the application to access the computing resource; and transmit data to the application server, the data notifying the application server that the attempt to access the computing resource was made by the application when the application was not configured to access the computing resource, and the data being usable by the application server to determine whether a corresponding computing resource on at least one different computing device is likely to be accessed when the application is executed on the at least one different computing device. The computing device may comprise a mobile device.

In another broad aspect, there is provided a computer-readable medium comprising instructions which, when executed by a processor of a computing device, cause the processor to perform a method of transmitting data from the computing device to an application server, and wherein the method comprises: executing an application at the computing device, wherein an attempt to access a computing resource on the computing device is made by the application; determining that the application is not configured to access the computing resource, in response to the attempt; displaying, in a user interface of the computing device, a permission request to allow the application to access the computing resource; and transmitting data from the computing device to the application server, the data notifying the application server that the attempt to access the computing resource was made by the application when the application was not configured to access the computing resource, and the data being usable by the application server to determine whether a corresponding computing resource on at least one different computing device is likely to be accessed when the application is executed on the different computing device.

In another broad aspect, there is provided a method of indicating that a computing resource is accessed by an application, the method performed by a processor of an application server, the method comprising: receiving, from a first computing device, data indicating that an attempt to access the computing resource on the first computing device was made by the application when the application was not configured to access the computing resource on the first computing device; for the computing resource on at least one different second computing device that corresponds to the computing resource on the first computing device, determining that the computing resource on the at least one second computing device is likely to be accessed when the application is executed on the at least one second computing device; and transmitting, to the at least one second computing device, data indicating that the computing resource on the at least one second computing device is likely to be accessed when the application is executed on the at least one second computing device.

In some embodiments, the method may further comprise: computing a number of first computing devices from which the data indicating that an attempt to access a computing resource on the first computing device was made by the application when the application was not configured to access the computing resource on the first computing device is received; and verifying that the number meets or exceeds a predefined threshold before determining that the computing resource on the at least one second computing device is likely to be accessed when the application is executed on the at least one second computing device.

In some embodiments, the predefined threshold is a number that is configurable at the application server.

In some embodiments, the application is not configured to access the computing resource on the first computing device if an installation manifest associated with the application fails to identify the computing resource on the first computing device as a resource that the application will access on the first computing device when the application is executed on the first computing device.

In some embodiments, the method further comprises transmitting, to a developer device, a request that the installation manifest associated with the application be updated to indicate that the computing resource is likely to be accessed by the application when the application is executed.

In another broad aspect, there is provided a server device configured to indicate that a computing resource is accessed by an application, the server device comprising a processor configured to: receive, from a first computing device, data indicating that an attempt to access the computing resource on the first computing device was made by the application when the application was not configured to access the computing resource on the first computing device; for the computing resource on at least one different second computing device that corresponds to the computing resource on the first computing device, determine that the computing resource on the at least one second computing device is likely to be accessed when the application is executed on the at least one second computing device; and transmit, to the at least one second computing device, data indicating that the computing resource on the at least one second computing device is likely to be accessed when the application is executed on the at least one second computing device.

In some embodiments, the server device comprises an application server.

In another broad aspect, there is provided a computer-readable medium comprising instructions which, when executed by a processor of a server device, cause the processor to perform a method of indicating that a computing resource is accessed by an application, wherein the method comprises: receiving, from a first computing device, data indicating that an attempt to access the computing resource on the first computing device was made by the application when the application was not configured to access the computing resource on the first computing device; for the computing resource on at least one different second computing device that corresponds to the computing resource on the first computing device, determining that the computing resource on the at least one second computing device is likely to be accessed when the application is executed on the at least one second computing device; and transmitting, to the at least one second computing device, data indicating that the computing resource on the at least one second computing device is likely to be accessed when the application is executed on the at least one second computing device.

In another broad aspect, there is provided a method of managing access to a computing resource, the method comprising: determining at least one computing resource on the computing device that an application is configured to access when the application is executed; for a computing resource on the computing device that the application is not configured to access when the application is executed, receiving, at the computing device, data that indicates that the computing resource is likely to be accessed when the application is executed on the computing device, and determining that the computing resource on the computing device that the application is not configured to access when the application is executed is likely to be accessed when the application is executed on the computing device based on the data; and displaying, in a user interface of the computing device, a first permission request to allow the application to access the computing resource on the computing device that the application is not configured to access when the application is executed.

In some embodiments, the method may further comprise: downloading an installation manifest associated with the application to the computing device, the installation manifest identifying the at least one computing resource on the computing device that the application is configured to access when the application is executed, and the installation manifest failing to identify the computing resource on the computing device that the application is not configured to access when the application is executed.

In some embodiments, the method may further comprise: displaying at least one second permission request to allow the application to access the at least one computing resource on the computing device that the application is configured to access when the application is executed, the first permission request being visually distinguishable when displayed in the user interface of the computing device from the at least one second permission request.

In some embodiments, the displaying is performed during an installation of the application on the computing device.

In some embodiments, the method may further comprise allowing the application to access the computing resource on the computing device that the application is not configured to access when the application is executed, if the first permission request is accepted.

In another broad aspect, there is provided a computing device configured to manage access to a computing resource, the computing device comprising a processor configured to: determine at least one computing resource on the computing device that an application is configured to access when the application is executed; for a computing resource on the computing device that the application is not configured to access when the application is executed, receive, at the computing device, data that indicates that the computing resource is likely to be accessed when the application is executed on the computing device, and determine that the computing resource on the computing device that the application is not configured to access when the application is executed is likely to be accessed when the application is executed on the computing device based on the data; and display, in a user interface of the computing device, a first permission request to allow the application to access the computing resource on the computing device that the application is not configured to access when the application is executed. The computing device may comprise a mobile device.

In another broad aspect, there is provided a computer-readable medium comprising instructions which, when executed by a processor of a computing device, cause the processor to perform a method of managing access to a computing resource, wherein the method comprises: determining at least one computing resource on the computing device that an application is configured to access when the application is executed; for a computing resource on the computing device that the application is not configured to access when the application is executed, receiving, at the computing device, data that indicates that the computing resource is likely to be accessed when the application is executed on the computing device, and determining that the computing resource on the computing device that the application is not configured to access when the application is executed is likely to be accessed when the application is executed on the computing device based on the data; and displaying, in a user interface of the computing device, a first permission request to allow the application to access the computing resource on the computing device that the application is not configured to access when the application is executed.

In another broad aspect, there is provided a system for managing access to a computer resource, wherein the system comprises: a first computing device configured to transmit data to an application server, wherein the first computing device comprises a first processor configured to: execute an application, wherein an attempt to access a computing resource on the first computing device is made by the application; determine that the application is not configured to access the computing resource, in response to the attempt; display, in a user interface of the first computing device, a permission request to allow the application to access the computing resource on the first computing device; and transmit data to the application server, the data notifying the application server that the attempt to access the computing resource was made by the application when the application was not configured to access the computing resource; the application server, comprising a second processor configured to: receive, from the first computing device, data indicating that the attempt to access the computing resource on the first computing device was made by the application when the application was not configured to access the computing resource on the first computing device; for the computing resource on at least one second computing device that corresponds to the computing resource on the first computing device, determine that the computing resource on the at least one second computing device is likely to be accessed when the application is executed on the at least one second computing device; and transmit, to the at least one second computing device, data indicating that the computing resource on the at least one second computing device is likely to be accessed when the application is executed on the at least one second computing device; and the second computing device, comprising a third processor configured to: determine at least one computing resource on the second computing device that the application is configured to access when the application is executed; for a computing resource on the second computing device that the application is not configured to access when the application is executed, receive, at the second computing device, application server data that indicates that the computing resource on the second computing device is likely to be accessed when the application is executed on the second computing device, and determine that the computing resource on the second computing device that the application is not configured to access when the application is executed is likely to be accessed when the application is executed on the second computing device based on the application server data; and display, in a user interface of the second computing device, a permission request to allow the application to access the computing resource on the second computing device that the application is not configured to access when the application is executed.

Figure 2:
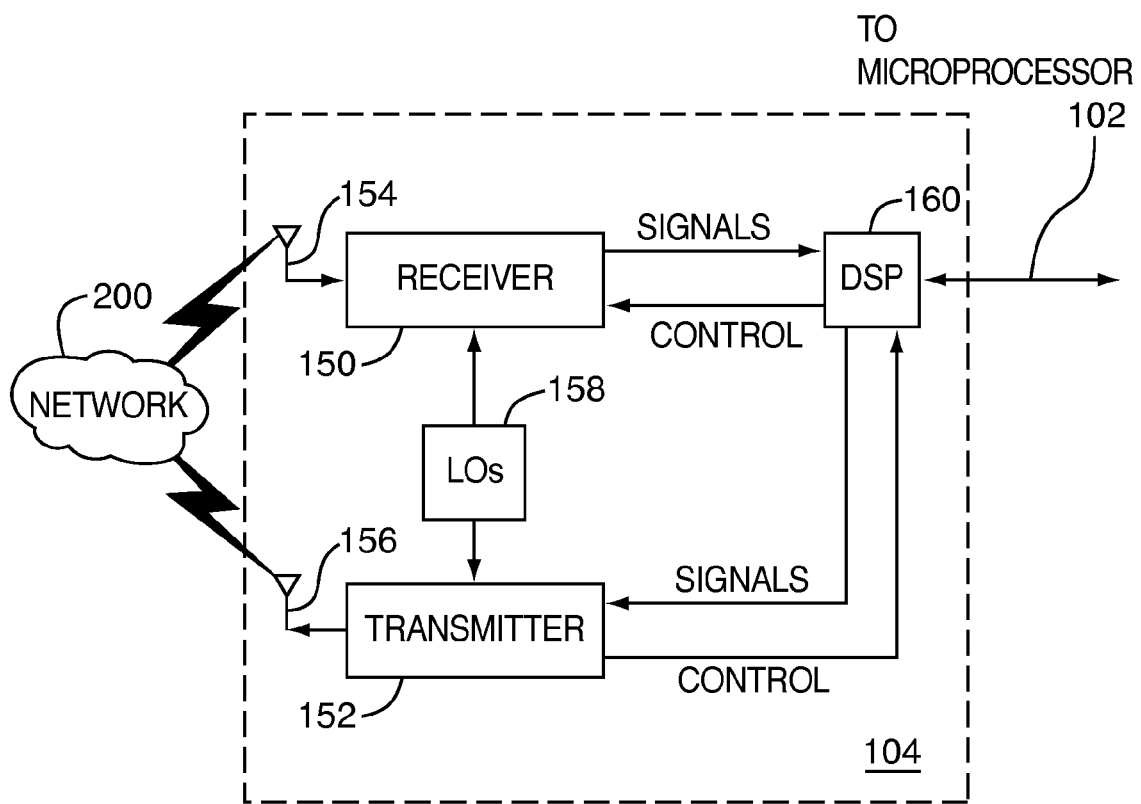
FIG. 2 is a block diagram of a communication sub-system component of the mobile device of FIG. 1.
Figure 3:
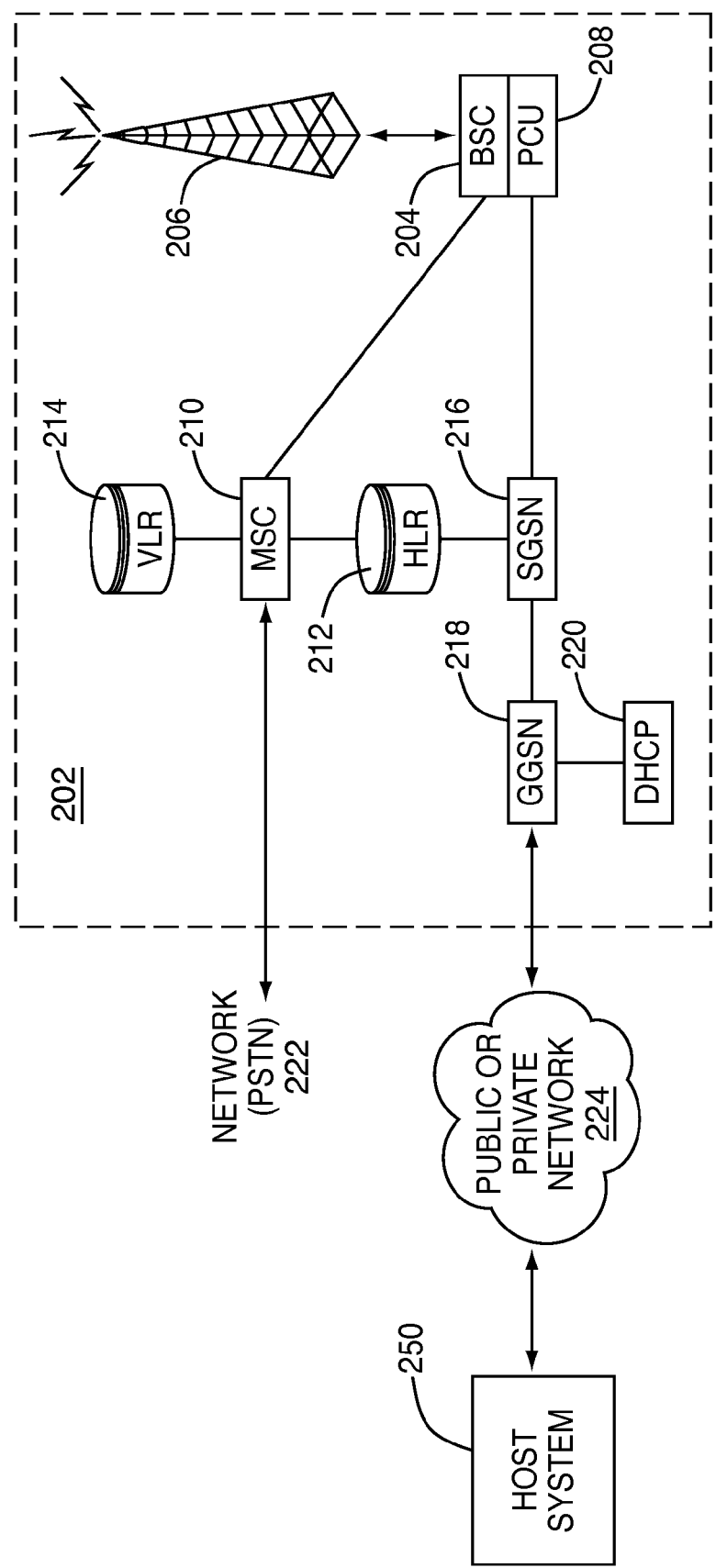
FIG. 3 is a block diagram of a node of a wireless network in one example implementation.

Reference is first made to FIGS. 1 to 3 for a general description of an example structure of a mobile device and how the mobile device operates and communicates with other devices. The mobile device (sometimes referred to alternatively as a "mobile station" or "portable electronic device") may comprise a two-way communication device with advanced data communication capabilities having the capability to communicate with other computer systems and devices. The mobile device may include the capability for voice communications, data communications or a combination of the two. Depending on the functionality provided by the mobile device, it may be referred to as a smartphone, a data messaging device, a two-way pager, a cellular telephone with data messaging capabilities, a wireless Internet appliance, a laptop computer, a tablet computer, a media player (such as an MP3 player), an electronic book reader or a data communication device (with or without telephony capabilities). Although a mobile device is described herein by way of illustration, embodiments described herein may be applicable to other computing devices other than mobile devices. For example, embodiments described herein may be applied to other computing platforms that guard resources with permission access requests in variant implementations.

Referring now to FIG. 1 specifically, a block diagram of a mobile device 100 in one example implementation is shown generally. Mobile device 100 comprises a number of components, the controlling component being microprocessor 102. Microprocessor 102 controls the overall operation of mobile device 100. In some embodiments, certain communication functions, including data and voice communications, are performed through communication subsystem 104. Communication subsystem 104 receives messages from and sends messages to a wireless network 200.

In this example implementation of mobile device 100, communication subsystem 104 may be configured for cellular communication in accordance with the Global System for Mobile Communication (GSM) and General Packet Radio Services (GPRS) standards. The GSM/GPRS wireless network is used worldwide and it is expected that other standards such as Enhanced Data GSM Environment (EDGE) and Universal Mobile Telecommunications Service (UMTS) may be employed. These standards are mentioned as examples only, and other standards may be employed on computing devices to which embodiments described herein are applied.

New standards are still being defined, but it is believed that they will have similarities to the network behavior described herein, and it will also be understood by persons skilled in the art that the described embodiments are intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

The wireless network associated with mobile device 100 may comprise a GSM/GPRS wireless network in one example implementation of mobile device 100; however, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and n-generation (e.g. 2.5G, 3G, 3.5G, 4G, etc.) networks like EDGE, UMTS, High-Speed Downlink Packet Access (HSDPA), High-Speed Uplink Packet Access (HSDPA), High-Speed Packet Access (HSPA), and Long Term Evolution (LTE), etc. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, one or more speakers 118, microphone 120, short-range communication subsystem 122 and other device subsystems 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator, media player or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications (illustrated as applications 402 in FIG. 4, below), or parts thereof, may be temporarily loaded into a volatile store such as RAM 106.

In some embodiments, mobile device 100 may send and receive communication signals over network 200 after required network registration or activation procedures have been completed. Network access is associated with a subscriber or user of a mobile device 100. To identify a subscriber, mobile device 100 may require a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200.

By inserting SIM 126 into SIM interface 128, a subscriber can access all subscribed services. Services could include: web browsing and messaging such as e-mail, voice mail, Short Message Service (SMS), media transfers (such as music downloading or streaming), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that subscribers are not necessarily bound by any single physical mobile device. SIM 126 may store additional subscriber information for a mobile device as well, including datebook (or calendar) information and recent call information. In certain embodiments SIM 126 may be a different type of user identifier and may be integral to mobile device 100 or not present at all. By way of further examples, a Universal Integrated Circuit Card (UICC), eUICC (Embedded UICC), Removable User Identify Module (R-UIM), CDMA Subscriber Identify Module (CSIM), or Universal Subscriber Identify Module (USIM) may be employed.

Mobile device 100 includes a power pack that supplies power to electronic components and that supports portability. The power pack may be of any type, but for clarity it will be assumed that mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed in flash memory 108 (or other non-volatile storage) on mobile device 100 during its manufacture.

Additional applications may also be loaded onto mobile device 100 through network 200, auxiliary I/O subsystem 112, serial port 114, short-range communications subsystem 122, or the other device subsystems 124. This flexibility in application installation increases the functionality of mobile device 100 and may provide enhanced on-device functions, communication-related functions, or both. For example, secure communication applications may enable electronic commerce functions and other such financial transactions to be performed using mobile device 100. Numerous other types of applications may be loaded onto mobile device 100 or other computing devices, including without limitation, messaging applications (e.g. e-mail, text, instant, video, etc.), voice communication applications, calendar applications, address book applications, utility applications, browser application, media player (e.g. audio, video, etc.) applications, social network applications, camera applications, gaming applications, productivity applications, etc.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

It should be noted that the term "download" and forms thereof as used herein, in the specification and in the claims, are used generally to describe a transfer of data from one system to another, and is not intended to be limiting with regards to the origin or destination of the transfer, for example. Accordingly, where the term "download" and forms thereof are used in the specification and in the claims, it is intended to encompass other forms of transfers including, for example, an "upload" or a "sideload" of data (e.g. a Universal Serial Bus (USB) sideload).

Short-range communications subsystem 122 provides for wireless device connections to enable communication between mobile device 100 and different systems or devices, without the use of network 200. For example, subsystem 122 may include an infrared device and associated circuits and components for short-range communication. Examples of short range communication would include standards developed by the Infrared Data Association (IrDA), Near Field Communication (NFC), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary I/O subsystem 112 may include devices such as: a touch screen, mouse, infrared fingerprint detector, or a roller wheel with a dynamic button pressing capability. Further, auxiliary I/O subsystem 112 may comprise a two-dimensional navigation (or scrolling) component, such as a track ball, a joystick or a directional pad, each optionally with a dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to the one or more speakers 118, and signals for transmission would be generated by microphone 120. Alternative voice or audio I/O subsystems, such as a voice message recording subsystem, may also be implemented on mobile device 100. Although voice or other audio signal output is accomplished primarily through the one or more speakers 118, display 110 may also be used to provide additional information such as the identity of a calling party, duration of a voice call, or other voice call related information. Microphone 120 can receive a supply of power, in the form of a bias voltage and bias current, from the rechargeable battery 130. Different types and configurations of microphone 120 can be incorporated into the mobile device 100.

Referring now to FIG. 2 specifically, a block diagram of the communication subsystem 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3 specifically, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server.

Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

The public or private network 224 may also provide access to a host system 250.

Figure 4:
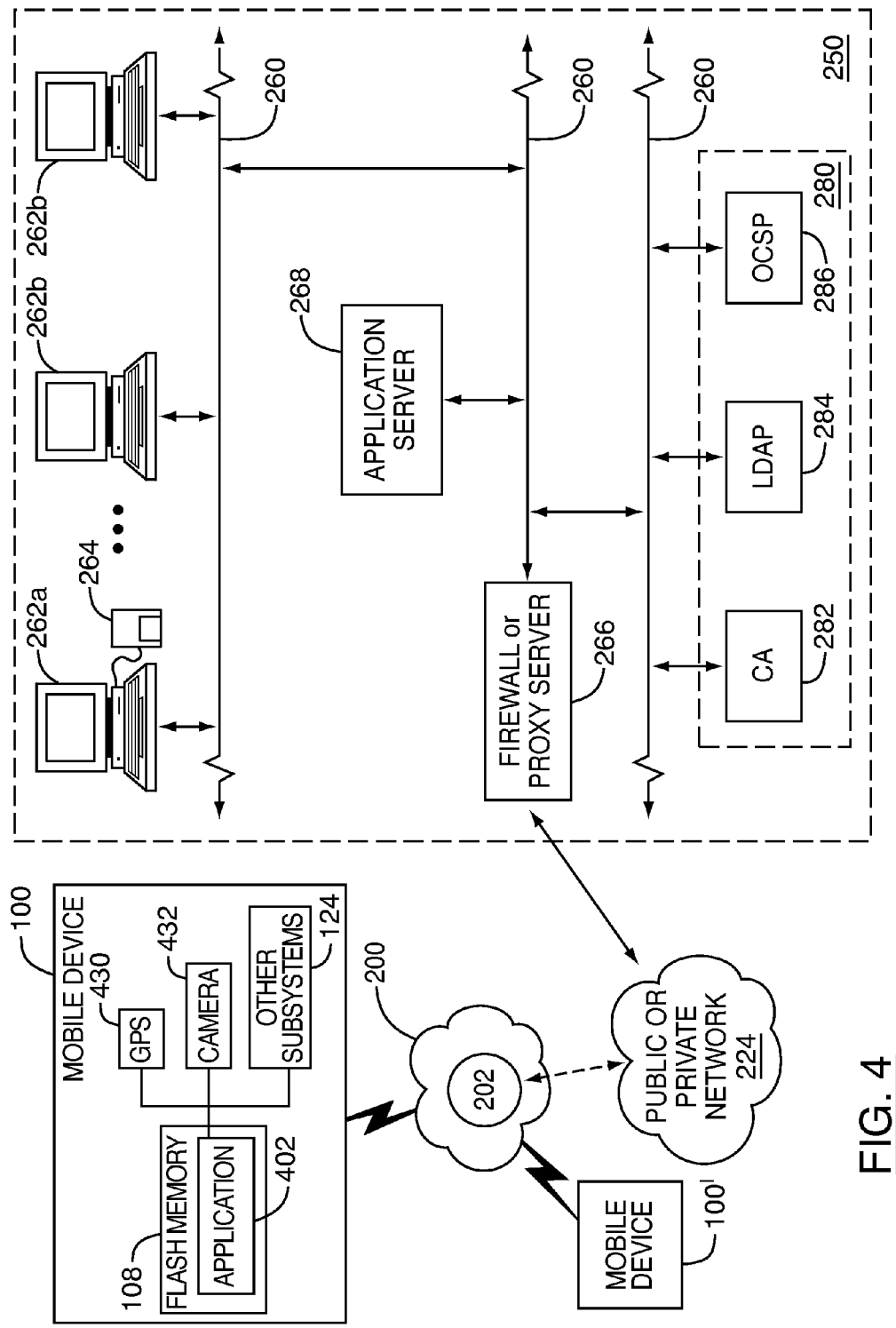
FIG. 4 is a block diagram illustrating components of a host system in one example configuration.

Referring now to FIG. 4, a block diagram illustrating components of a host system in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

LAN 250 comprises a number of network components connected to each other by LAN connections 260. For instance, a user's desktop computer 262a with an accompanying cradle 264 for the user's mobile device 100 is situated on LAN 250. Cradle 264 for mobile device 100 may be coupled to computer 262a by a serial or a USB connection, for example. Other user computers 262b are also situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262a to mobile device 100, and may be particularly useful for bulk information updates often performed in initializing mobile device 100 for use. The information downloaded to mobile device 100 may include certificates used in the exchange of messages. It will be understood by persons skilled in the art that user computers 262a, 262b will typically be also connected to other peripheral devices not explicitly shown in FIG. 4.

Embodiments described herein relate generally to control of applications (e.g. 402). Accordingly, only a subset of network components of LAN 250 are shown in FIG. 4 for ease of exposition, and it will be understood by persons skilled in the art that LAN 250 will comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router is new in the wireless industry and implies that a VPN connection can be established directly through a specific wireless network to mobile device 100. The possibility of using a wireless VPN router has only recently been available and could be used when the new Internet Protocol (IP) Version 6 (IPV6) arrives into IP-based wireless networks. This new protocol will provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection would preferably be a Transmission Control Protocol (TCP)/IP or User Datagram Protocol (UDP)/IP connection to deliver the messages directly to mobile device 100 in this variant implementation.

Secure communication protocols rely on public and private encryption keys to provide confidentiality and integrity, and on a Public Key Infrastructure (PKI) to communicate information that provides authentication and authorization. Data encrypted using a private key of a private key/public key pair can only be decrypted using the corresponding public key of the pair, and vice-versa. Private key information is never made public, whereas public key information is shared.

For example, if a sender wishes to send a message to a recipient in encrypted form, the recipient's public key is used to encrypt a message, which can then be decrypted only using the recipient's private key. Alternatively, in some encoding techniques, a one-time session key is generated and used to encrypt the body of a message, typically with a symmetric encryption technique (e.g. Triple DES). The session key is then encrypted using the recipient's public key (e.g. with a public key encryption algorithm such as RSA), which can then be decrypted only using the recipient's private key. The decrypted session key can then be used to decrypt the message body. The message header may be used to specify the particular encryption scheme that must be used to decrypt the message. Other encryption techniques based on public key cryptography may be used in variant implementations. However, in each of these cases, only the recipient's private key may be used to facilitate decryption of the message, and in this way, the confidentiality of messages can be maintained.

As a further example, a sender may sign a message using a digital signature. A digital signature is a digest of the message (e.g. a hash of the message) encrypted using the sender's private key, which can then be appended to the outgoing message. To verify the signature of the message when received, the recipient uses the same technique as the sender (e.g. using the same standard hash algorithm) to obtain a digest of the received message. The recipient also uses the sender's public key to decrypt the digital signature, in order to obtain what should be a matching digest for the received message. If the digests of the received message do not match, this suggests that either the message content was changed during transport and/or the message did not originate from the sender whose public key was used for verification. By verifying a digital signature in this way, authentication of the sender and message integrity can be maintained.

An encoded message may be encrypted, signed, or both encrypted and signed. The authenticity of public keys used in these operations is validated using certificates. A certificate is a digital document issued by a certificate authority (CA). Certificates are used to authenticate the association between users and their public keys, and essentially, provides a level of trust in the authenticity of the users' public keys. Certificates contain information about the certificate holder, with certificate contents typically formatted in accordance with an accepted standard (e.g. X.509).

For a public key to be trusted, its issuing organization must be trusted. The relationship between a trusted CA and a user's public key can be represented by a series of related certificates, also referred to as a certificate chain. The certificate chain can be followed to determine the validity of a certificate.

Certificate servers store information about certificates and lists identifying certificates that have been revoked. These certificate servers can be accessed to obtain certificates and to verify certificate authenticity and revocation status. For example, a Lightweight Directory Access Protocol (LDAP)

server may be used to obtain certificates, and an Online Certificate Status Protocol (OCSP) server may be used to verify certificate revocation status.

User computers 262a, 262b can obtain certificates from a number of sources, for storage on computers 262a, 262b and/or mobile devices (e.g. mobile device 100). These certificate sources may be private (e.g. dedicated for use within an organization) or public, may reside locally or remotely, and may be accessible from within an organization's private network or through the Internet, for example. In the example shown in FIG. 4, multiple PKI servers 280 associated with the organization reside on LAN 250. PKI servers 280 include a CA server 282 for issuing certificates, an LDAP server 284 used to search for and download certificates (e.g. for individuals within the organization), and an OCSP server 286 used to verify the revocation status of certificates.

Certificates may be retrieved from LDAP server 284 by a user computer 262a, for example, to be downloaded to mobile device 100 via cradle 264. However, in a variant implementation, LDAP server 284 may be accessed directly (i.e. "over the air" in this context) by mobile device 100, and mobile device 100 may search for and retrieve individual certificates through a mobile data server 288. Similarly, mobile data server 288 may be adapted to allow mobile device 100 to directly query OCSP server 286 to verify the revocation status of certificates.

In variant implementations, only selected PKI servers 280 may be made accessible to mobile devices (e.g. allowing certificates to be downloaded only from a user's computer 262a, 262b, while allowing the revocation status of certificates to be checked from mobile device 100).

In variant implementations, certain PKI servers 280 may be made accessible only to mobile devices registered to particular users, as specified by an IT administrator, possibly in accordance with an IT policy, for example.

Other sources of certificates [not shown] may include a Windows certificate store, another secure certificate store on or outside LAN 250, and smart cards, for example.

Applications 402 executable on a mobile device 100 may be stored on an application server 268. Application server 268 may have an application database [not shown] that stores applications 402 for download and execution on the mobile device 100. To have access to the applications 402 stored on the application server 268, each user may have a user account managed by the application server 268. Access to the application server 268 may be provided via a client application operating on mobile device 100, although in variant embodiments, access to the application server may be provided through a web browser, for example.

As illustrated, the application server 268 may comprise an internal network server of the host system 250 used to store applications 402 to be deployed to the organization's mobile devices 100. In a variant embodiment, the application server 268 may additionally or alternatively provide an application store or application market that is accessible from the mobile device 100. The application store may allow users of a mobile device 100 to search for, purchase, and download applications 402 to their mobile device 100. In some embodiments, the application server 268 may reside outside of the host system 250, on a remote system accessible via the public or private network 224, for example.

For ease of understanding the described embodiments related to application control, FIG. 4 further illustrates a simplified view of a subset of components of the mobile device 100 described above. The mobile device 100 may run software applications 402 (sometimes referred to simply as "apps") that access computing resources on the mobile device 100. Applications may be stored in the flash memory 108 of the mobile device 100 or other persistent store, and may access computing resources available on the mobile device 100 when executed. Access may be in the form of the applications invoking application programming interfaces (APIs) made available by the OS to access the computing resources, for example.

Computing resources may be associated with a hardware component (e.g., sensors, radios, or peripherals described above) or a software module (e.g., ones that provide access to data or communication buses described above), and may be made accessible to the application 402 via an API provided by the operating system (OS) of the mobile device 100. For example, the mobile device 100 may allow applications to access a GPS subsystem 430 that is capable of determining the physical location of the mobile device 100, or a camera subsystem 432 that is capable of capturing photographs or video. Other accessible resources may include access to software functionality (e.g., encryption services) or data (e.g., phone book entries) available on the mobile device 100, for example.

An installation manifest [not explicitly shown in FIG. 4] that identifies the computing resources that an application 402 may access when the application is executed on mobile device 100, may be associated with the application 402. Accordingly, when a given computing resource is identified in an installation manifest associated with an application, the application is configured to access the computing resource, and the user can expect that computing resource to be accessed by the application, though not necessarily in every single instance when the application executes. Conversely, when the installation manifest associated with the application fails to identify the computing resource as a resource that the application will access on the computing device when the application is executed, then the application is not configured to access the computing resource.

The installation manifest may be uploaded with the application 402 to the application server 268 from a developer device by the application developer. The installation manifest may be stored with the application 402 on the application server 268, and subsequently provided with an application being downloaded to mobile device 100.

A software or application developer creating the application may include the installation manifest in an application manifest that describes the application 402, which may be specifically formatted for the operating system (OS) that the application 402 is intended to be executed on. For example, the application manifest may be a property list (plist) file for the iOS operating system, or an AndroidManifest.xml file in the Android operating system in some implementations. The application manifest may be stored in an XML format.

Figure 5:
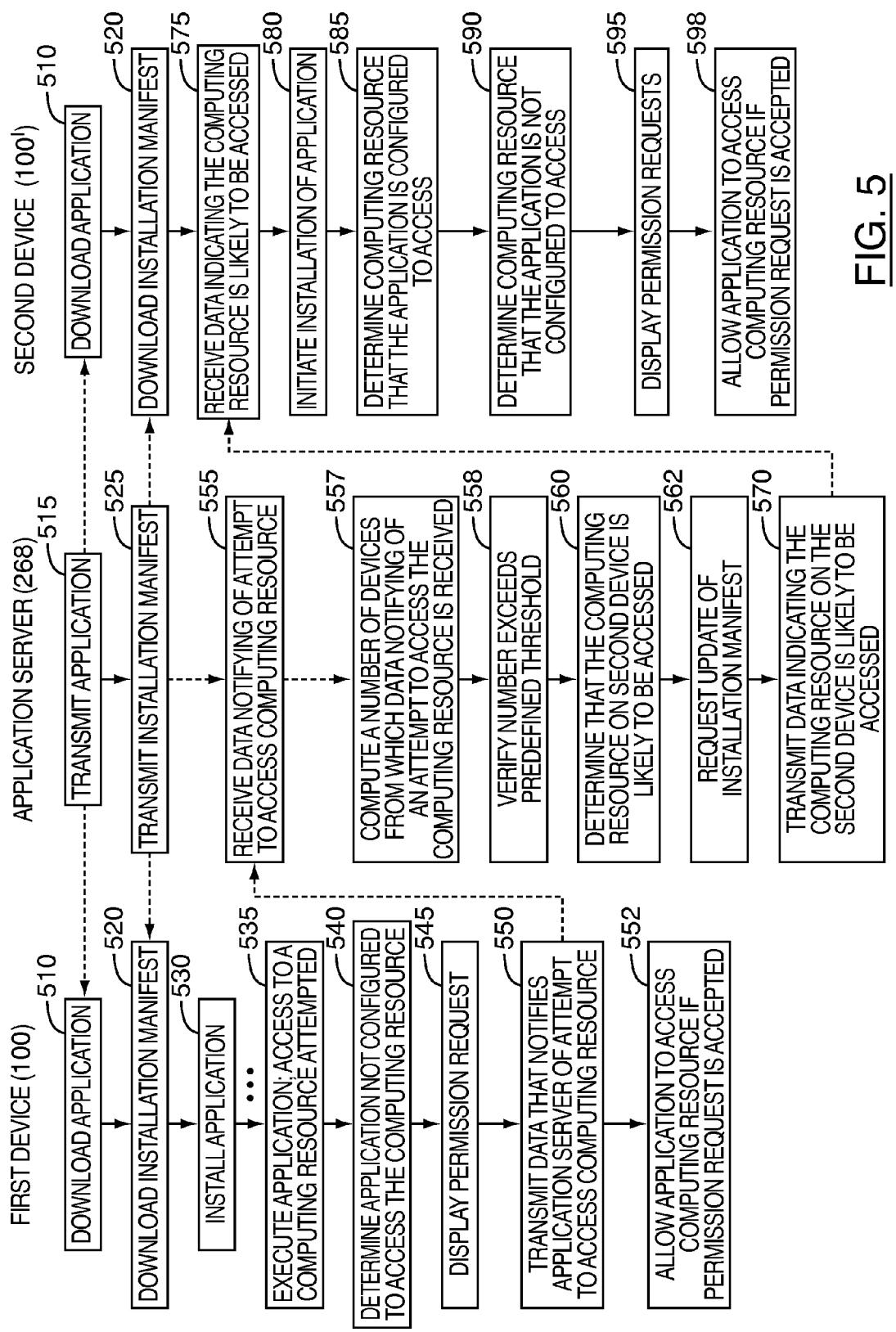
FIG. 5 is a flowchart diagram illustrating the interaction and sequence of events amongst an application server, a first device, and a second device, in accordance with at least one embodiment.

Referring now to FIG. 5, a flowchart diagram illustrating acts associated with at least one example embodiment is shown generally as 500. For convenience, embodiments are described in the context of a mobile device, such as the mobile device 100 shown in FIG. 1.

Figure 6A:
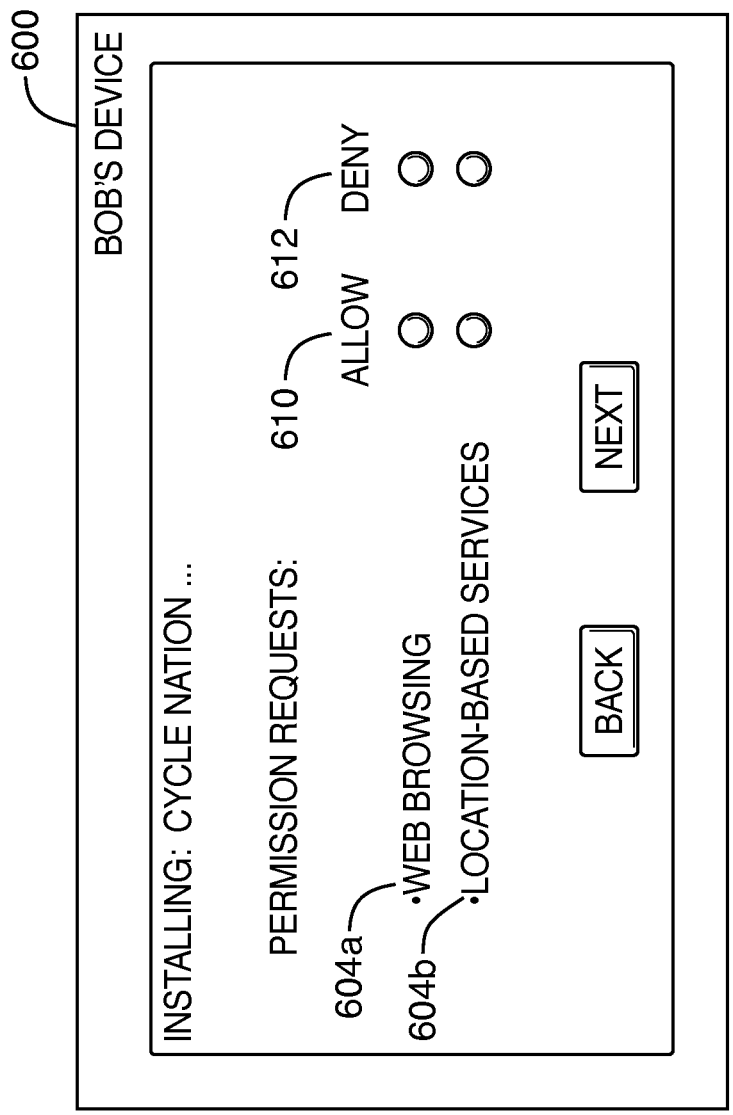
FIG. 6A is an example visual output of permission requests that may be displayed when installing an application on a first mobile device.
Figure 6B:
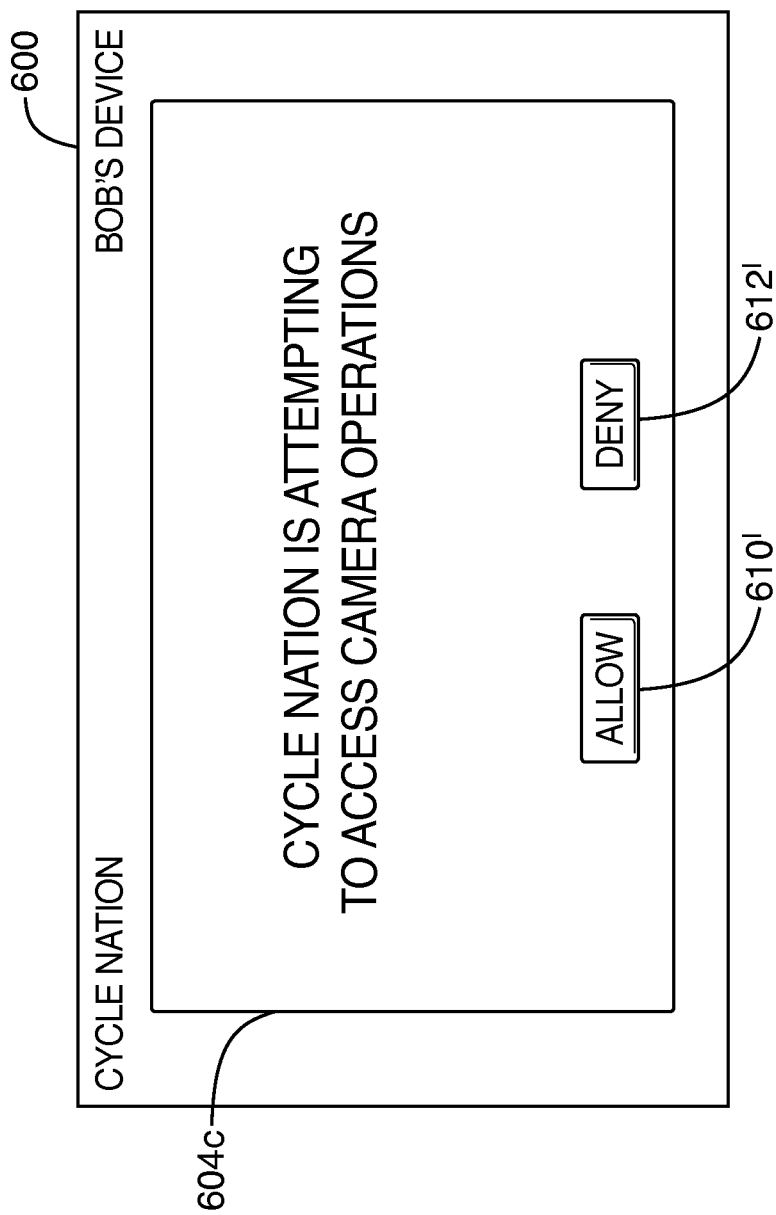
FIG. 6B is an example visual output of a permission request that may be displayed during execution of an application on the first mobile device.
Figure 7:
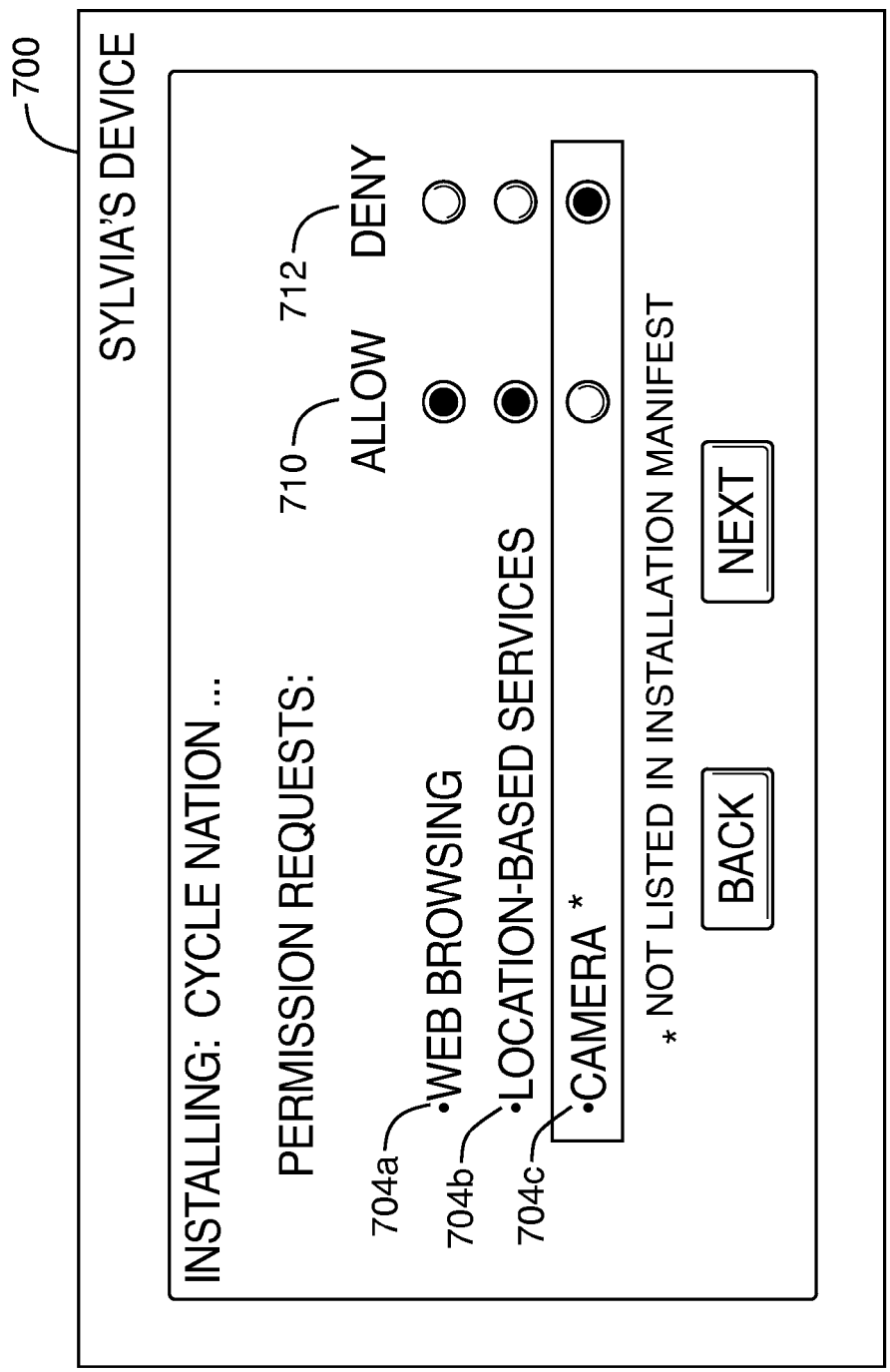
FIG. 7 is an example visual output of permission requests that may be displayed during installation of the application on a second mobile device.

To more clearly illustrate the acts of FIG. 5, reference will also be made to FIGS. 6A, 6B and 7, which show examples of visual output involving an example scenario where an application entitled 'CycleNation' that is installed on two separate mobile devices: 'Bob's device', and 'Sylvia's device' will be discussed.

At 510, an application (e.g. application 402 of FIG. 4) is downloaded from an application server (e.g. application server 268 of FIG. 4) to a first mobile device (e.g. mobile device 100), the application being transmitted from the application server 268 to the mobile device 100 at 515.

In the case where applications stored on an application server 268 are provided in an application store, application 402 may be downloaded at 510 as a result of a mobile device 100 searching for applications 402 available on the application store, identifying a desired application 402, and downloading the desired application to mobile device 100. In another embodiment, the transmission of the application 402 may occur as a result of information technology (IT) personnel of an organization (e.g. an administrator) deciding to deploy an application 402 to mobile devices 100 within their organization through the host system 250.

At 520, an installation manifest associated with the application 402 downloaded at 510 is also downloaded to the first mobile device 100, the installation manifest being transmitted from the application server 268 to the first mobile device 100 at 525. As previously noted, the installation manifest identifies computing resources that the application 402 may access when the application 402 is executed on the first mobile device 100. In some embodiments, the installation manifest may be downloaded together with the application (e.g. in a package bundle) downloaded at 510.

At 530, the first mobile device 100 installs the application 402 downloaded at 520. The installation process may include displaying, to a user in a user interface (e.g. in display 110 of FIG. 1), permission requests to access each of the computing resources identified in the installation manifest downloaded to the first mobile device 100 at 520 and associated with the application 402.

In an example scenario, a user 'Bob' may find a cycling application 402 entitled 'CycleNation', in an application store, available for download to his mobile device. The 'CycleNation' application 402 may need to determine the location of Bob's mobile device to identify Bob's mobile device on cycling routes, and access the application developer's website to display cycling maps. As such, the 'CycleNation' application's installation manifest may identify the 'web browsing' and 'location-based services' computing resources on Bob's mobile device to indicate that Bob should expect the 'CycleNation' application to access these two resources (e.g. their respective APIs) of Bob's mobile device when the application is executed.

Referring to FIG. 6A, an example visual output that may be displayed on a user interface of 'Bob's device' 600 when installing the 'CycleNation' application 402 is shown. As illustrated, the permission request is displayed for the 'web browsing' 604a and location-based services' 604b computing resources (each requiring access to Bob's mobile web browser API and location-based services API). The location of 'Bob's device' may be determined based on data provided by GPS or wireless networks or both. The permission request may present the option to allow 610 or deny 612 access to each of the listed computing resources. It will be understood that in variant embodiments, different user interfaces to present permission requests may be provided. For example, permission requests may be provided for each requested computing resource in successive individual screens.

In a variant embodiment, permission requests for these resources may not be displayed on the first mobile device 100, and the permission to access the computing resources may be automatically accepted. This may happen, for example, if the first mobile device 100 can determine that the application developer for the application has a trusted status, as defined in a user configuration. Alternatively, a security policy (e.g. IT policy) governing use of the first mobile device 100 may provide that certain permission requests may be automatically accepted.

At 535, at some point in time after the installation of the application 402 at 530, the first mobile device 100 executes the application 402. This may be performed in response to a user's direction to execute the application, by selecting an associated application icon, for example. During execution of the application 402, an attempt to access a computing resource on the first mobile device 100 is made by the application 402.

In the example scenario described above, this may involve the mobile device 100 accessing a camera API that the 'CycleNation' application provides to capture photographs of features on a cycling route.

At 540, the first mobile device 100 determines that the application 402 is not configured to access the computing resource, in response to the attempt made at 535. It may do this, for example, by examining the installation manifest associated with the application 402, and determining that the installation manifest fails to identify the computing resource as a computing resource that the application 402 will access on the first mobile device 100 when the application is executed.

In the example scenario described above, the installation manifest for the 'CycleNation' application does not list the camera API as a computing resource that the application will access when the application is executed. This resulted in a permission request not being displayed for the computing resource during installation.

An installation manifest associated with a given application may fail to identify a computing resource as one that the given application will access, for various reasons. For example, an application may attempt to surreptitiously gain access to a computing resource, hoping that after having installed and executed the application, the user will be less likely to deny access to certain computing resource on the user's mobile device. In some instances, the failure to identify the computing resource in the installation manifest may not be malicious; for example, an application developer may simply have neglected to update the installation manifest when releasing a new version of the application to indicate that the new version of the application will access a computing resource not previously identified in the installation manifest associated with the application. For example, in the 'CycleNation' example scenario, the application developer may have added the camera functionality to the application, and uploaded it to the application server without making a corresponding update to the installation manifest. As a further example, additional functionality may be provided by an application, as a result of the application developer adding new features to an application 402 or because a new computing resource is being made available on certain mobile devices.

At 545, the first mobile device 100 displays a permission request to allow the application 402 to access the computing resource that the application 402 is attempting to access at 535, during execution of the application 402. This permission request may be displayed to a user in a user interface of the first mobile device 100.

FIG. 6B illustrates an example visual output displaying the 'CycleNation' application's permission request 604c for the camera API on 'Bob's Device' 600. When viewing the permission request, a user may allow 610' or deny 612' the 'CycleNation' application access to the camera API.

At 550, the first mobile device 100 transmits data that notifies the application server 268 of the attempt to access the computing resource by the application 402 made at 535, when the application 402 was not configured to access the computing resource as determined at 540. This data is then received by the application server 268 at 555. At 552, the application 402 may be allowed access to the computing resource if the permission request displayed at 545 is accepted by the user (or the access may be otherwise denied), which may occur before, after, or contemporaneously with the transmission of data to the applications server 268 at 550.

Now referring to further acts performed at application server 268, the data received from first mobile device at 550, may be transmitted from multiple, different first mobile devices 100. For example, the application 402 may be installed on a number of first mobile devices 100, and each of those first mobile devices 100 may transmit data to the application server 268 indicating that an attempt to access a particular computing resource was made by the application 402 at all of those first mobile devices 100.

The greater the number of first mobile devices that the application server 268 receives this notification from, the more likely it is that the application 402 actually does access the particular computing resource when the application 402 is executed. Obtaining this type of data from multiple first mobile devices may be referred to as "crowd sourcing", and the data may be referred to as "crowd sourced usage data". The crowd sourced usage data may be used at the application server 268, for example, to determine that it is likely that the application 402 accesses the particular computing resource when the application 402 is executed, even though the particular computing resource is not identified in the installation manifest associated with the application 402 as being a computing resource that the application 402 will access when the application 402 is executed.

In accordance with at least one embodiment described herein, when application server 268 can determine, based on the crowd sourced usage data that it has received (e.g. at 555 for each first mobile device 100), that the application 402 actually does access the particular computing resource when the application 402 is executed despite the particular computing resource not being so identified in the installation manifest, it can use this information to improve the usability of other computing devices (e.g. second mobile device 100'). For example, application server 268 can provide this information to the other computing devices, so that permission requests in respect of the computing resource not identified in the installation manifest may be provided during the installation of an application rather than during the execution of the application. As a further example, application server 268 may notify the application's developer to update the installation manifest.

Referring again to FIG. 5, at 557, the application server 268 may compute a number of the first mobile devices 100 from which data indicating that an attempt to access a computing resource on the respective first mobile device 100 was made. This may involve tracking and recording the identity of each first mobile device 100.

At 558, the application server 268 may verify that the number exceeds a predefined threshold, before determining that the application 402 is likely to access the computing resource on other second mobile devices (100') when the application 402 is executed on those other second mobile devices (100'). In some embodiments, the predefined threshold is a number that is configurable at the application server 268. For example, this may be a minimum number of first computing devices 100 that reports of the attempts to access a computing resource. The minimum number may depend on the type or category of the application 402. It will be understood that other ways to predefine the threshold may also be possible, in variant embodiments.

In at least one embodiment, the predefined threshold may be one. That is, after receiving data (e.g. at 555) indicating that an attempt to access a computing resource on a single mobile device (e.g., first mobile device 100) was made, the application server 268 may determine that the application 402 is likely to access the computing resource on other devices when the application 402 is executed on those other devices. However, a higher threshold may be defined to ensure that the data received at 555 was not the result of a device malfunction.

In a variant embodiment, the device 100 may be able to track the number of times (i.e., how many instances) the computing resource is accessed on the first device 100 after the permission request is accepted at 552. This information may then also be provided to the application server 268 for use in determining whether the resource is likely to be accessed. For example, if a computing resource is seldom accessed again after the initial permission request at 545, the application server 268 may consider this as a factor when determining whether the computing resource is likely to be accessed. A predefined threshold number for accesses after the initial permission request is accepted may also be configured at the application server 268 for this purpose.

At 560, if the number computed at 557 meets or exceeds the predefined threshold, the application server 268 determines that the corresponding computing resource on a second mobile device 100' is likely to be accessed when the application is executed on the second mobile device 100'.

In response to the determination at 560, optionally, at 562, the application server 268 may transmit, to a developer device, a request that the installation manifest associated with the application be updated to indicate that the computing resource is likely to be accessed by the application 402 when the application is executed. The request may be useful in informing the application developer that the installation manifest associated with their application needs to be updated (e.g., as may be the case when the application developer failed to update the installation manifest when updating their application 402).

In response to the determination at 560, at 570, the application server 268 transmits data to the second mobile device 100', indicating that the computing resource for which the determination was made is likely to be accessed by the application 402 when the application 402 executed on the second mobile device 100', even though the application 402 may not be configured to access the computing resource at the second mobile device 100' (e.g., because the installation manifest fails to identify the computing resource). The data transmitted at 570 may be considered as supplementing the data provided by the installation manifest that is downloaded to the second mobile device 100'. In embodiments where the act at 560 is performed, the data transmitted at 570 may occur before, after, or contemporaneously with the transmission of the request at 560.

By way of illustration, reference is made to the example scenario presented earlier in this description. The 'CycleNation' application may be installed on a number of different first mobile devices. When the application is executed, and an attempt to access the camera API is made on one or more of these first mobile devices, the application server may receive data from each of these first mobile devices indicating that the 'CycleNation' application is attempting to access the camera API even though the application is not configured to access the camera API of the first mobile device based on the installation manifest associated with the application. If the number of first mobile devices reporting that an attempt to access the camera API was made by the 'CycleNation' application exceeds a predefined threshold, the application server may then determine that the 'CycleNation' application is likely to access the camera API on other mobile devices. Subsequently, data indicating that the camera API is likely to be accessed can be transmitted to the other mobile devices to inform these other mobile devices, even though the other devices may not expect the camera API to be accessed since the installation manifest still fails to identify that the 'CycleNation' application will access the camera API.

The application server is able to obtain information about the computing resources that an application is likely to access by receiving the data from devices on which the applications are already deployed, rather than analyzing the application itself or the associated installation manifest. For example, the described embodiments may be preferable to known methods of profiling API invocations made by an application to determine the computing resources the application is likely to access, since there may be occasions when the mere invocation of an API is insufficient to accurately determine the computing resources that the application will likely access. For example, in the Unix operating system, an invocation of an 'Open' system function may result in any one of the opening of a file (requiring access to the file system computing resource) or a socket (requiring access to the network communications computing resource) depending on the parameters provided in the invocation. As a result, an application server 268 may not be able to determine which computing resource the application 402 is likely to access from knowledge and analysis of the API invocation alone.

As previously noted, once an application server 268 has determined that a computing resource is likely to be accessed at the second mobile device 100' by the application 402, it can use that information when providing the same application 402 to the second mobile device 100'. Reference is now made to acts performed at the second mobile device 100' in FIG. 5. Some of the acts performed at the second mobile device 100' are analogous to acts previously described with respect to the first mobile device 100, and the reader is directed to the earlier description of these acts for further details.

At 510, the application is transmitted from the application server 268 and downloaded to the second mobile device 100', and at 520, the installation manifest associated with the application may be transmitted and downloaded to the second mobile device 100', in a manner analogous to the corresponding acts performed at the first mobile device 100.

In accordance with example embodiments described herein, prior to installation of the application on the second mobile device 100', the data indicating that the computing resource is likely to be accessed by the application 402 when the application 402 executes on the second mobile device 100', as transmitted by application server 268 at 570, is received at the second mobile device 100' at 575.

For example, the data received at 575 may be received prior to the initiation of an installation (580). The data received at 575 may be received with the application downloaded at 510, with the installation manifest at 520, or both.

In variant embodiments, the data received at 575 may be received in response to the initiation of an installation, but before the installation is completed. In these embodiments, the data received at 575 may be requested from the application server 268 by the second mobile device 100' (not shown in FIG. 5).

In variant embodiments, the data received at 575 may be received after installation of an application is completed.

At 585, the second mobile device 100' may determine at least one computing resource on the second mobile device 100' that the application 402 is configured to access when the application 402 is executed. As with the first mobile device 100, the second mobile device 100' may identify computing resources on the installation manifest as those that are likely to be accessed by the application 402.

Continuing with the 'CycleNation' application example, the same installation manifest as downloaded to the first mobile device that identifies the 'web-browsing' and location-based services' computing resources, may be downloaded to the second mobile device after or when the 'CycleNation' application is downloaded to the second mobile device. Accordingly, the second mobile device may identify the same computing resources as those that are likely to be accessed by the 'CycleNation' application on the first mobile device.

At 590, the second mobile device 100' may determine at least one computing resource on the computing device that the application 402 is not configured to access when the application 402 is executed. As discussed with respect to act 540 above, this may be performed by examining the installation manifest associated with the application 402 and the data received at 575, to determine that the installation manifest fails to identify a computing resource as one that will be accessed by the application 402 because the computing resource is identified in the data received at 575 but not in the installation manifest received at 520.

At 595, the second mobile device 100' displays, in a user interface of the second mobile device 100', a first permission request to allow the application 402 to access the identified computing resource on the second mobile device 100' that the application 402 is not configured to access when the application is executed.

If the first permission request is denied, the second mobile device 100' may be configured to perform certain acts [not shown in FIG. 5], which may include without limitation: aborting the installation and/or deleting the application from the mobile device; allowing the application to be installed but not executed; or allowing the application to be installed and executed despite the first permission request not being accepted, etc.

Optionally, the second mobile device 100' may also display at least one second permission request to allow the application 402 to access the at least one computing resource on the computing device that the application 402 is configured to access when the application 402 is executed. Second permission requests may be displayed alongside or generally listed together with the first permission request. In one embodiment, the first permission request may be displayed so that it is visually distinguishable from any second permissions requests being displayed, to highlight the absence of the associated computing resource from the installation manifest, for example. The first permission request may be visually distinguished using an asterisk, red or other colored text or highlighting, warning language, or other formatting or markings. Other ways of drawing attention to the first permission request may be implemented in variant embodiments.

At 598, the second mobile device 100' may allow the application 402 to access to the computing resource on the second mobile device 100' that the application 402 is not configured to access when the application 402 is executed, if the first permission request displayed at 595 is accepted. The second mobile device 100' may also allow the application 402 to access to the computing resource on the second mobile device 100' that the application 402 is configured to access when the application 402 is executed, if the corresponding second permission request is accepted [not explicitly shown in FIG. 5].

Referring to FIG. 7, an example visual output showing first and second permission requests for the 'CycleNation' application when installing the application at a second mobile device (i.e., 'Sylvia's device' 700) is shown. As illustrated, the second permission requests for the computing resources that the application is configured to access ('web-browsing' 704a and location-based services' 704b, as identified in the installation manifest) are displayed. The first permission request 704c for the camera resource (based on the supplementary data provided by the application server) is also displayed in a visually distinguished manner, with a box around the first permission request 704c, and the first permission request 704c is marked with an asterisk. In this example, a note is also provided in the user interface to explicitly indicate to the user that the computing resource is not listed in the installation manifest. The user can then select to allow 710 or deny 712 access to each of these computing resources by the 'CycleNation' application through the provided radio buttons or other user interface.

If the first permission request is accepted, the installation of the 'CycleNation' application may be permitted to continue, for example. If the first permission request is denied, the second mobile device may be configured to perform certain acts, which may include without limitation: aborting the installation and/or deleting the application from the mobile device; allowing the application to be installed but not executed; or allowing the application to be installed and executed despite the first permission request not being accepted, etc.

Some of the acts of one or more methods described herein may be provided as software instructions, stored on computer-readable storage media and executable by a processor. Examples of computer-readable storage media may include a hard disk, a floppy disk, an optical disk (e.g. a compact disk, a digital video disk), a flash drive or flash memory, magnetic tape, and memory. Other configurations are possible as well.

In variant implementations, some of the acts of one or more methods described herein may be provided as executable software instructions stored in transmission media.

As used herein, the wording "and/or" is intended to represent an inclusive-or. That is, "X and/or Y" is intended to mean X or Y or both. Moreover, "X, Y, and/or Z" is intended to mean X or Y or Z or any combination thereof.

The present disclosure makes reference to a number of embodiments. However, it will be understood by persons skilled in the art that other variants and modifications may be made without departing from the scope of the embodiments defined in the claims appended hereto.

The invention claimed is:

1. A method of transmitting data from a computing device to an application server, the method comprising:
   executing an application at the computing device, wherein an attempt to access a computing resource on the computing device is made by the application;
   determining, in response to the attempt to access the computing resource, that the application is not configured to access the computing resource because an installation manifest associated with the application fails to identify the computing resource as a resource that the application will access on the computing device when the application is executed;
   displaying, in a user interface of the computing device, a permission request to allow the application to access the computing resource; and
   transmitting data from the computing device to the application server, wherein the data indicates that the attempt to access the computing resource was made by the application while the application was not configured to access the computing resource;
   wherein receipt of the data at the application server triggers the application server to transmit, to a developer device associated with an application developer for the application, information indicating that the attempt to access the computing resource was made by the application and a request that an installation manifest associated with the application be updated to indicate that the computing resource will be accessed by the application.

2. The method of claim 1, further comprising, before executing the application:
   downloading the application to the computing device;
   downloading the installation manifest associated with the application to the computing device; and
   installing the application on the computing device.

3. The method of claim 2, wherein the installation manifest and the application are downloaded to the computing device from the application server.

4. The method of claim 1, further comprising allowing the application to access the computing resource on the computing device if an acceptance of the permission request is received.

5. The method of claim 1, wherein the data transmitted from the computing device to the application server comprises a version of the application that attempted to access the computing resource on the computing device.

6. The method of claim 5, wherein receipt of the version of the application at the application server triggers the application server to transmit the version of the application to the developer device.

7. The method of claim 1, wherein the application server verifies that a number of computing devices from which the data is transmitted meets or exceeds a threshold prior to transmitting, to the developer device, the information indicating that an attempt to access the computing resource was made by the application.

8. A non-transitory computer-readable medium comprising instructions which, when executed by a processor of a computing device, result in:
   executing an application at the computing device, wherein an attempt to access a computing resource on the computing device is made by the application;
   determining, in response to the attempt to access the computing resource, that the application is not configured to access the computing resource because an installation manifest associated with the application fails to identify the computing resource as a resource that the application will access on the computing device when the application is executed;
   displaying, in a user interface of the computing device, a permission request to allow the application to access the computing resource; and
   transmitting data from the computing device to a application server, wherein the data indicates that the attempt to access the computing resource was made by the application while the application was not configured to access the computing resource;
   wherein receipt of the data at the application server triggers the application server to transmit, to a developer device associated with an application developer for the application, information indicating that the attempt to access the computing resource was made by the application and a request that an installation manifest associated with the application be updated to indicate that the computing resource will be accessed by the application.

9. The non-transitory computer-readable medium of claim 8, wherein the instructions, when executed by the processor, further result in allowing the application to access the computing resource on the computing device if an acceptance of the permission request is received.

10. The non-transitory computer-readable medium of claim 8, wherein the data transmitted to the application server comprises a version of the application that attempted to access the computing resource on the computing device.

11. The non-transitory computer-readable medium of claim 10, wherein receipt of the version of the application at the application server triggers the application to transmit the version of the application to the developer device.

12. The non-transitory computer-readable medium of claim 8, wherein the application server verifies that a number of computing devices from which the data is transmitted meets or exceeds a threshold prior to transmitting, to the developer device, the information indicating that an attempt to access the computing resource was made by the application.

13. A computing device configured to transmit data to an application server, wherein the computing device comprises a processor configured to:
- execute an application, wherein an attempt to access a computing resource on the computing device is made by the application;
- determine, in response to the attempt to access the computing resource, that the application is not configured to access the computing resource because an installation manifest associated with the application fails to identify the computing resource as a resource that the application will access on the computing device when the application is executed;
- display, in a user interface of the computing device, a permission request to allow the application to access the computing resource; and
- transmit data to the application server, wherein the data indicates that the attempt to access the computing resource was made by the application while the application was not configured to access the computing resource;

wherein receipt of the data at the application server triggers the application server to transmit, to a developer device associated with an application developer for the application, information indicating that the attempt to access the computing resource was made by the application and a request that an installation manifest associated with the application be updated to indicate that the computing resource will be accessed by the application.

14. The computing device of claim 13, wherein the processor is further configured, before the application is executed, to:
- download the application to the computing device;
- download the installation manifest associated with the application to the computing device; and
- install the application on the computing device.

15. The method of claim 14, wherein the installation manifest and the application are downloaded to the computing device from the application server.

16. The computing device of claim 13, wherein the processor is further configured to allow the application to access the computing resource on the computing device if an acceptance of the permission request is received.

17. The computing device of claim 13, wherein the data transmitted to the application server comprises a version of the application that attempted to access the computing resource on the computing device.

18. The computing device of claim 17, wherein receipt of the version of the application at the application server triggers the application server to transmit the version of the application to the developer device.

19. The computing device of claim 13, wherein the application server verifies that a number of computing devices from which the data is transmitted meets or exceeds a threshold prior to transmitting, to the developer device, the information indicating that an attempt to access the computing resource was made by the application.

20. The computing device of claim 13, wherein the computing device comprises a mobile device.

* * * * *

UNITED STATES PATENT AND TRADEMARK OFFICE
CERTIFICATE OF CORRECTION

| | | |
|---|---|---|
| PATENT NO. | : 9,112,866 B2 | Page 1 of 1 |
| APPLICATION NO. | : 14/132728 | |
| DATED | : August 18, 2015 | |
| INVENTOR(S) | : Michael Anthony Carrara et al. | |

It is certified that error appears in the above-identified patent and that said Letters Patent is hereby corrected as shown below:

In the claims

Column 26, Claim 15, should recite "The computing device of claim 14, wherein the installation manifest and the application are downloaded to the computing device from the application server."

Signed and Sealed this
Thirteenth Day of October, 2015

Michelle K. Lee
*Director of the United States Patent and Trademark Office*